United States Patent [19]

Crema

[11] Patent Number: 4,676,916
[45] Date of Patent: Jun. 30, 1987

[54] ACIDIZING CONCENTRATES FOR OIL WELL ACIDIZING SYSTEMS

[75] Inventor: Stefano C. Crema, Wyandotte, Mich.

[73] Assignee: BASF Corporation, Wyandotte, Mich.

[21] Appl. No.: 803,629

[22] Filed: Dec. 2, 1985

[51] Int. Cl.$^4$ .............................................. E21B 43/27
[52] U.S. Cl. .................... 252/8.553; 166/307
[58] Field of Search ............ 252/8.55 C, 8.55 B, 252/8.55 R

[56] References Cited

U.S. PATENT DOCUMENTS

| | | | |
|---|---|---|---|
| 2,674,619 | 4/1954 | Lundsted | 252/356 X |
| 3,083,158 | 3/1963 | Markham | 252/8.55 |
| 3,162,601 | 12/1964 | Jones | 252/8.55 |
| 3,819,520 | 6/1974 | Jones et al. | 252/8.55 |
| 4,342,657 | 8/1982 | Blair | 252/8.55 |

FOREIGN PATENT DOCUMENTS 2109034  5/1983  United Kingdom ............... 252/8.55

*Primary Examiner*—Herbert B. Guynn
*Attorney, Agent, or Firm*—John C. Demeter; David L. Hedden

[57] ABSTRACT

The subject invention relates to acidizing concentrates used to prepare acidizing systems for oil and gas recovery. The additives comprise:
(a) a $C_4$–$C_{12}$ aliphatic alcohol, and
(b) a polyether nonionic surfactant having the following structural formula:

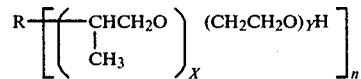

wherein R is the residue of an aliphatic alcohol having 2 to 10 carbon atoms resulting from the oxyalkylation of a corresponding aliphatic alcohol having a functionality equal to n, and n has a value of 2 to 3; and wherein X and Y are numbers such that the ratio of X to Y is from 8:1 to 0.31 in the total molecular weight of the molecule is from 1,000 to 15,000.

5 Claims, No Drawings

ACIDIZING CONCENTRATES FOR OIL WELL ACIDIZING SYSTEMS

BACKGROUND OF THE INVENTION

1. Field of the Invention

This invention relates to acidizing concentrates for oil well acidizing systems. The acidizing concentrates comprise an aliphatic alcohol and specified nonionic polyether surfactants. The acidizing concentrates are added to aqueous acid solutions to form acidizing systems.

2. Description of the Prior Art

One of the major methods known for stimulating oil wells involves the injection of an acidizing system into the well to dissolve formation minerals and foreign materials such as drilling muds that are introduced into the formation during well drilling procedures.

There are a variety of acidizing systems which are used in this process. Two of the major concerns which exist in selecting such systems are their ability to wet the surface area and their ability to dissolve deposits which impede the flow of oil. British Patent Application No. 2,109,034A describes an effective acidizing system. It consists of an aqueous acid solution, a $C_4$–$C_{10}$ aliphatic alcohol, and a phosphate ester anionic surfactant. Although this system has been found to be effective, there is still a need to develop alternative systems and improve the effectiveness of such systems, particularly with respect to their ability to wet the surface area of the deposit and dissolve deposits which impede the flow of oil.

SUMMARY OF INVENTION

The subject invention relates to acidizing concentrates used to prepare acidizing systems for oil and gas recovery. The additives comprise:

(a) a mixture consisting of a branched aliphatic $C_3$–$C_6$ alcohol and a branched aliphatic $C_7$–$C_{10}$ alcohol, and (b) a polyether nonionic surfactant having the following structural formula:

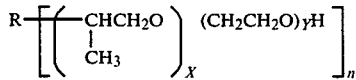

wherein R is the residue of an aliphatic hydroxyl containing compound having 2 to 10 carbon atoms resulting from the oxyalkylation of a corresponding aliphatic alcohol having a functionality equal to n, and n has a value of 2 to 3; and wherein X and Y are numbers such that the ratio of X to Y is from 8:1 to 0.3:1 and the total molecular weight of the molecule is from 1,000 to 15,000.

The weight ratio of components (a) and (b) is from 10:1 to 1:10. The concentrates are mixed with acidizing solutions to form acidizing systems in amounts such that the total amount of concentrate in the system will be from 0.01 to 10.0 percent by weight based upon the total weight of the acidizing system.

The addition of the polyether nonionic surfactant to the acidizing concentrate enhances the ability of the acidizing system to wet the surface area of the deposit and dissolve deposits which interfere with the flow of oil.

DESCRIPTION OF THE PREFERRED EMBODIMENTS

In general in preparing the subject acidizing concentrates, a mixture consisting of a branched $C_3$–$C_6$ alcohol, preferably isopropanol, and a branched $C_7$–$C_{10}$ alcohol, preferably isooctanol is used. The weight ratio of the $C_3$–$C_6$ alcohol to $C_7$–$C_{10}$ alcohol may vary over wide ranges, but generally is from 1:10 to 10:1.

Polyether nonionic surfactants (their structure has been set forth previously) are prepared by methods well known in the art. Essentially, a $C_2$–$C_{10}$ diol or triol initiator is reacted with propylene oxide and ethylene oxide in sequence in the presence of an oxyalkylation catalyst to prepare a block copolymer having an internal propylene oxide segment and an external ethylene oxide segment. Preferred initiators which can be used are ethylene glycol, propylene glycol, and trimethylol propane. The preferred ratio of propylene oxide to ethylene oxide is from 6:1 to 0.7:1. Preferred molecular weight ranges from 3,000 to 7,000.

A component which can optionally be used in the concentrate to replace some of the nonionic polyether is a phosphate ester anionic surfactant. Although they do not improve the performance of the acidizing system, they do improve the compatibility of the components of the system.

The phosphate ester anionic surfactants which are used are described in British Patent Application No. 2,109,034A. They are anionic detergents made of mixtures of mono- and di-phosphate esters of alkyl alcohols, oxyalkylated alcohols or phenols, or the like wherein one or more terminal hydroxyl groups is phosphorylated, producing a compound of the following general formula:

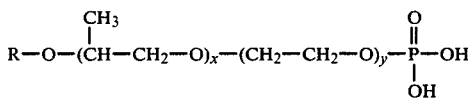

where R is an alkyl radical, phenyl or alkyl phenol group, hydrogen, or a phosphate group; and x and y represent the degree of oxypropylation and oxyethylation, respectively. The phosphate ester surfactant is preferably employed in the acid form; however, the partially neutralized form is equivalent for purposes of this invention to the extent that it is converted to the acid form in an acidizing solution. The particularly preferred phosphate ester surfactants useful in the present invention are the phosphate esters of the oxyalkylated fatty alcohols as described in U.S. Pat. No. 3,629,127 herein incorporated by reference as descriptive thereof. Another preferred series of phosphate ester surfactants useful in the present invention is the phosphate esters of the PLURONIC ® polyols as described in U.S. Pat. No. 2,674,619 also incorporated herein by reference.

The anionic phosphate ester surfactant may be used to replace up to 50 percent of the polyether nonionic surfactant.

Acidizing systems can be prepared from the concentrates by mixing the concentrates with an acidizing solution. Generally, the acidizing solution will contain an acid such as hydrochloric acid in a concentration of from 3 to 28 percent by volume based upon the total volume of the acidizing solution which will also contain water. Other acids used in the present invention include by way of example, but not limited thereto, the common inorganic and mineral acids such as $H_2CO_4$, $H_2SO_3$, $HNO_3$, $H_3PO_4$, sulfamic and the like, organic acids such as formic, acetic, propionic, gluconic, citric, hydroxyacetic (glycolic), diglycolic, oxalic, aminocarboxylic (especially intrilo acetic), amino polyalkyl phosphonic, EDTA, hydroxy EDTA, glutaric, malonic, tartaric, succinic, maleic, salicyclic, benzoic, toluic, lactic, amino benzoic, polyacrylic, adipic, mixtures thereof and their anhydrides. Carbon dioxide and water solutions also represent useful aqueous acid continuous phase for purposes of the present invention, particularly in enhanced oil recovery applications. The acidizing solution will generally be from about 90 to 99.9 percent by volume of the acidizing system. Particularly preferred are systems wherein the remainder of the acidizing system will be composed of the concentrate and optional ingredients such as corrosion inhibitors, emulsion preventers, and silt suspenders. Although it is preferred to form the concentrate and mix it with the acidizing solution to form the acidizing system, this is not essential. It is possible to mix the components of the concentrate individually with the acidizing solution in any sequence. However, this is not as economical and efficient as first forming the concentrate which can be more readily shipped at the place of production and diluted at the place where used.

The examples which follow will illustrate in more detail how to prepare the subject concentrates and acidizing solutions which are used to prepare the acidizing systems. These examples will also illustrate the advantages of these acidizing systems with respect to their wetting ability and their ability to dissolve deposits which impede the flow of oil in the well. Although these examples disclose specific embodiments of the invention, it is contemplated that variations from these examples will also be operable. The following abbreviations will be used in the examples:

NS-1 —a nonionic surfactant having an average molecular weight of 5,000 prepared by reacting propylene oxide and ethylene oxide in sequence with propylene glycol such that the ethylene oxide content is approximately 30 percent by weight of the total molecule.

NS-2 —a nonionic surfactant having an average molecular weight of 6,000 prepared by reacting propylene oxide and ethylene oxide in sequence with propylene glycol such that the ethylene oxide content is approximately 40 percent by weight of the total molecule.

AS—phosphate ester anionic surfactant disclosed in Example XIX of Great Britain Patent Application No. 2,109,034A and known as PLURADYNE® OF-90 surfactant.

IOA—isooctyl alcohol

IPA—isopropyl alcohol

EXAMPLES

Four concentrates were prepared by mixing the components shown in Table I which follows. It should be noted that Examples A and B are comparison examples. They were prepared in accordance with Great Britain Patent Application No. 2,109,034A and do not contain a nonionic surfactant.

TABLE I

| Components | Examples (percent by weight) | | | |
|---|---|---|---|---|
| | A | B | 1 | 2 |
| NS-1 | — | — | 30 | — |
| NS-2 | — | — | — | 30 |
| IOA | 20 | 20 | 20 | 20 |
| IPA | 30 | 30 | 30 | 30 |
| Water | 20 | 50 | 20 | 20 |
| AS | 30 | — | — | — |

The efficiency of the four concentrates was tested by measuring the time needed to dissolve a ball of synthetic sludge containing about 20 percent by weight of heavy hydrocarbons, 70 percent by weight of calcium carbonate, and 10 percent by weight of Bentonite when put in 15 percent aqueous hydrochloric acid. Table II describes the results of this experiment. It shows how much time in minutes (numbers in the column beneath concentrations) it took the acidizing systems with the four concentrates to dissolve the sludge at concentrations of 0.5 and 0.3 percent by weight based upon the total weight of the acidizing system.

TABLE II

| Concentrate | Concentration | |
|---|---|---|
| | 0.5 | 0.3 |
| A | 14.0 | 19.0 |
| B | * | * |
| 1 | 7.5 | 9.0 |
| 2 | 7.5 | 11.0 |
| Blank | * | * |

*In these experiments more than 50 percent of the sludge ball remained intact after 30 minutes.

The results shown in Table II indicate that the nonionic surfactant improved the ability of the concentrate to dissolve the sludge ball at the specified concentrations.

The water wetting capacity for the four concentrates was also determined by measuring the contact angles in quartz (immersed in kerosene) of drops of the acidizing systems prepared with the concentrates. The contact angle was measured in degrees after 0, 4, 7, and 24 hours. Smaller contact angles indicate that the acidizing system is wetting more surface area.

TABLE III

| Concentrate | Contact Angle (Degrees) after 0, 4, 7, & 24 hrs. | | | |
|---|---|---|---|---|
| A | 44 | 42 | 41 | 40 |
| B | 67 | 110 | 127 | 121 |
| 1 | 51 | 33 | <10 | <10 |
| 2 | 44 | 44 | 43 | 43 |

The data of Table III shows that the concentrate having the nonionic surfactant, particularly NS-1, improves the wetting ability of the acidizing system.

The embodiments of the invention in which an exclusive privilege or property is claimed are defined as follows:

1. An acidizing composition for treating oil-bearing formations comprising:
   (a) from about 90 to about 99.99 percent by volume of an aqueous acid solution; and
   (b) from about 0.01 to about 10 percent by weight of an acidizing concentrate consisting of: a mixture of a branched aliphatic $C_3$–$C_6$ alcohol and a branched aliphatic $C_7$–$C_{10}$ alcohol; and an effective amount of a nonionic polyether surfactant to render the alcohols soluble in the acid, said surfactant having the formula:

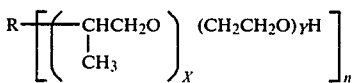

where R is the oxyalkylation residue of a $C_2$–$C_{10}$ diol or triol; n is an integer of 2 or 3; X and Y are numbers such that the ratio of X to Y is from 8:1 to 0.3:1; and the total molecular weight of the molecule is from 1,000 to 15,000 wherein the weight ratio of said mixture of alcohols to said nonionic surfactant is from 10:1 to 1:10; said composition being capable of dissolving sludge deposits in said oil-bearing formations.

2. The composition of claim 1 wherein said mixed alcohols are isopropanol and isooctanol in a weight ratio of 5:1 to 1:5.

3. The acidizing composition of claim 2 wherein a phosphate ester anionic surfactant is used to replace up to 50 percent by weight of the polyether nonionic surfactant.

4. The acidizing composition of claim 1 wherein the concentrate is greater than 0.1 percent by volume of the acidizing composition.

5. The acidizing composition of claim 1 wherein a phosphate ester anionic surfactant is used to replace up to 50 percent by weight of the polyether nonionic surfactant.

* * * * *